US006683414B2

(12) United States Patent
Whaley

(10) Patent No.: US 6,683,414 B2
(45) Date of Patent: Jan. 27, 2004

(54) ION-SHIELDED FOCUSING METHOD FOR HIGH-DENSITY ELECTRON BEAMS GENERATED BY PLANAR COLD CATHODE ELECTRON EMITTERS

(75) Inventor: David Riley Whaley, Rolling Meadows, IL (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 10/057,623

(22) Filed: Oct. 25, 2001

(65) Prior Publication Data

US 2003/0080689 A1 May 1, 2003

(51) Int. Cl.[7] ............................ H01J 7/24; G01N 21/01

(52) U.S. Cl. ............................... 315/111.81; 250/423 F

(58) Field of Search ....................... 315/111.21, 111.31, 315/111.41, 111.51, 111.61, 111.71, 111.81, 111.91; 250/423 R, 423 F, 424, 427; 313/309, 336, 422

(56) References Cited

U.S. PATENT DOCUMENTS 4,288,716 A * 9/1981 Hinkel et al. ............... 313/230
4,740,705 A 4/1988 Crewe
4,886,969 A 12/1989 Knauer
5,430,347 A * 7/1995 Kane et al. ................. 313/309
5,497,053 A 3/1996 Tang et al.
5,514,847 A * 5/1996 Makishima et al. ... 219/121.12
5,723,867 A * 3/1998 Imura ..................... 250/423 F
5,908,699 A * 6/1999 Kim ............................ 257/10
5,910,701 A * 6/1999 Takemura .................... 257/10
5,929,557 A 7/1999 Makishima et al.
5,955,849 A * 9/1999 Tang et al. ................. 313/336
6,037,717 A * 3/2000 Maishev et al. ....... 204/298.16
6,084,341 A * 7/2000 Takemura .................... 257/11
6,097,138 A * 8/2000 Nakamoto .................. 313/309
6,130,507 A * 10/2000 Maishev et al. ........ 250/423 R
6,255,768 B1 * 7/2001 Gorski et al. ............... 313/307
6,307,309 B1 * 10/2001 Okamoto et al. ........... 313/306
6,429,596 B1 * 8/2002 Jamison et al. ............. 313/306

* cited by examiner

*Primary Examiner*—Don Wong
*Assistant Examiner*—Minh D A
(74) *Attorney, Agent, or Firm*—Stetina Brunda Garred & Brucker

(57) ABSTRACT

An apparatus and a method of focusing a high-current-density electron beam emitted from a cold cathode electron emitter. A series of shaped electrostatic lense are provided in front an emission surface of the cold cathode electron emitter. An ion shield is further inserted in front of the emission surface. By applying different focusing voltages to the shaped electrostatic lenses, the electron beam is focused and well confined.

22 Claims, 8 Drawing Sheets

ION-SHIELDED FOCUSING METHOD FOR HIGH-DENSITY ELECTRON BEAMS GENERATED BY PLANAR COLD CATHODE ELECTRON EMITTERS

BACKGROUND OF THE INVENTION

The present invention relates generally to an apparatus and a method for focusing an electron beam generated from a cold cathode electron emitter, and more particularly to an apparatus and a method with an ion shield for focusing a high-current-density electron beam generated from a planar cold cathode electron emitter.

Field emission has been extensively used in characterization of material surface structure and electronic properties. Apart from the surface physics, field emission at present, has gained a different importance in technology. Field emitters can be used as cathodes for electron emission applications because of the superior emission properties.

At present, thermionic cathodes are employed exclusively in applications that require high-density electron beams. Replacement of these thermionic cathodes by high-density cold cathodes is predicted to allow performance unachievable by these thermionic emitters. For a planar, high current density cold electron source such as a field emitter array (FEA) or a wide bandgap material, though high current density of electron beam can be generated due to its inherently compact nature, electron beam control is a challenge before practical applications for high power device. As the cold emitters are generally non-convergent, that is, as the surface of the emitter is planar and the resulting beam has a natural tendency to defocus due to the large space charge forces created by the high current density, the difficulty in controlling the electron beam is further exacerbated.

Beam emittance is another issue. Due to the nature of emission process, cold emitters generally produce beams with perpendicular velocity spreads several times that of the beams produced by space charge limited thermionic emitters. This can result in beam interception on the focusing elements or poor beam confinement once the beam has been injected into a confining magnetic field. Therefore, to design an apparatus which focuses an electron beam created by a high-density planar cold cathode emitter, issues of beam emittance must be addressed during the design process.

SUMMARY OF THE INVENTION

An apparatus and a method of focusing a high-current-density electron beam emitted from a cold cathode electron emitter are provided to overcome the problems occurring in the prior art. A series of shaped electrostatic lenses are located in front an emission surface of the cold cathode electron emitter. By applying different focusing voltages to the electrostatic lenses simultaneously, the high-density-current electron beam is well focused with a laminar profile and well-confined in the magnetic field in the travel wave tube. The magnitude of focusing voltage applied to each of the electrostatic lenses is limited to a range that will well focus the electron beam and well confine it within the magnetic field.

In the above apparatus, the cold cathode electron emitter comprises a non-convergent emission surface, from which the high-current-density electron beam is emitted. In one embodiment of the invention, four shaped electrostatic lenses are used. The electrostatic lenses are electrically isolated from each using an isolation ceramic. The cold cathode electron emitter further comprises a weld flange holding an anode in front of the series of electrostatic lenses. Again, the isolation ceramic is used to electrically isolate the anode from the electrostatic lenses. Physically, between every two neighboring electrostatic lenses, and between the emission surface and the electrostatic lenses, there is located an isolation ceramic. Further, an ion shield is inserted in front of the emission surface, which applies a positive potential between the high-voltage emission surface and a grounded body of the device to which the electron gun is attached. The magnitude of the positive potential is sufficiently large to screen the ion bombardment.

In one embodiment of the invention, the above apparatus and method provides a well-focused laminar electron beam with a current density between 0 A/cm$^2$ to 20 A/cm$^2$.

BRIEF DESCRIPTION OF THE DRAWINGS

These, as well as other features of the present invention, will become more apparent upon reference to the drawings wherein.

DETAILED DESCRIPTION OF THE INVENTION

Figure 1:
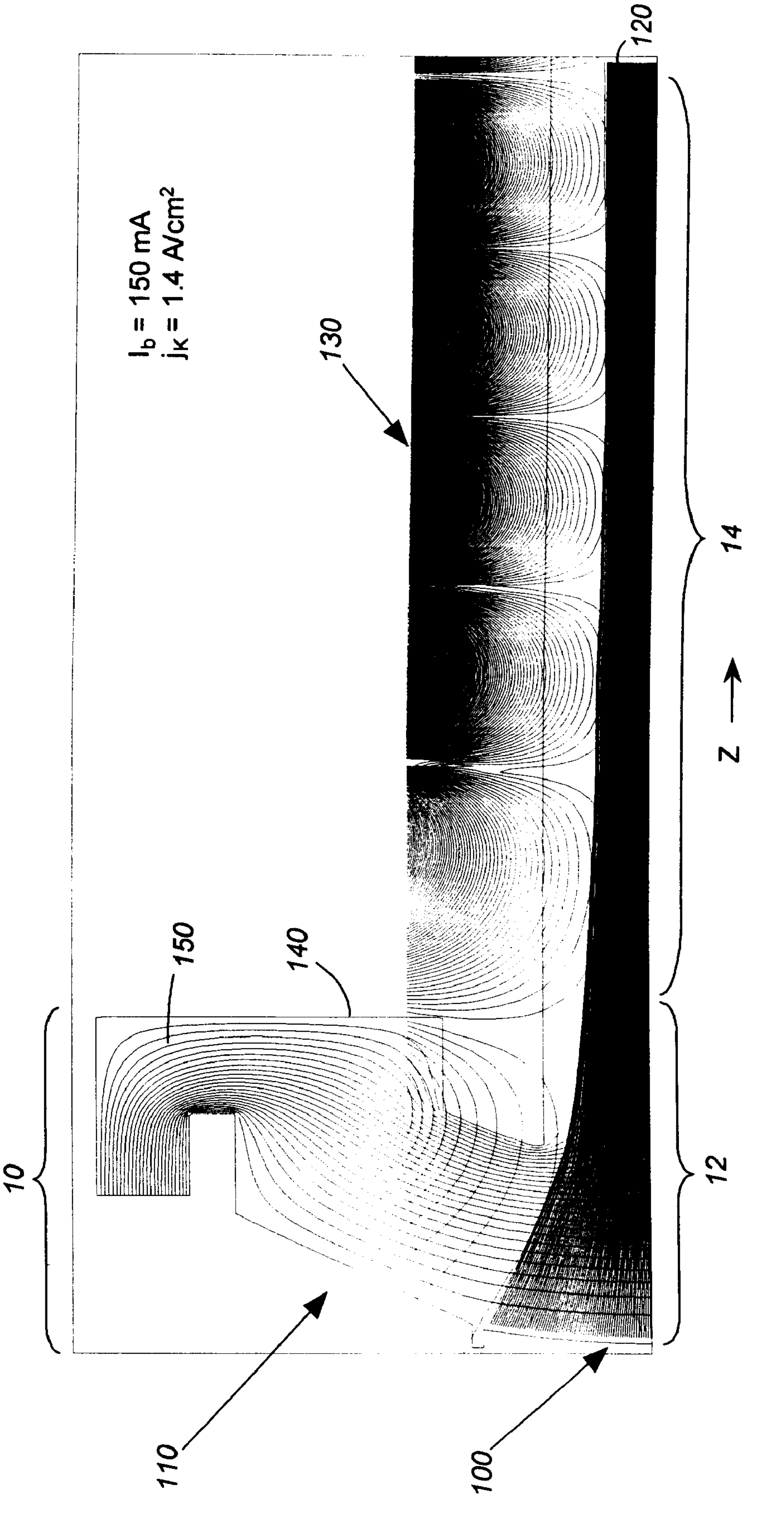
FIG. 1 shows an optics simulation of electron beam propagating from a thermionic cathode surface into a magnetic field.

FIG. 1 shows an optics simulation of electron beam emitted from a thermionic cathode surface propagating into a magnetic field. In FIG. 1, an expanded view of the gun region of a traveling wave tube (TWT) is illustrated. The standard Pierce gun includes a convergent spherical thermionic emitter 100, Pierce focusing electrode 110 and anode 140, which provide the accelerating electric field and shape the potential surfaces in the electron gun region. The electron beam 120 emitted from the emission surface of the convergent spherical thermionic emitter 100 has a low beam energy and is confined in a magnetic field. The electron beam is accelerated by the potential field generated by the Piercing focusing electrode 110 and anode 140. The potential contours, denoted as 150, are shown to indicate the region of beam acceleration. Being accelerated, the electron beam 120 enters the tunnel with helix, of which a high magnetic field is applied and a high beam energy is obtained. Through the electron beam tunnel with helix, the electron beam then reaches the collector (not shown). In FIG. 1, five magnetic cells are shown, and the magnetic contours are shown and denoted as 130. FIG. 1 shows a well focused and confined electron beam emitted from the conventional thermionic emitter in the absence of RF wave. Such reproducible, scallop-free profile of electron beam along the axis (z-axis) of the electron gun is demanded in the cold cathode electron emitter.

Figures 2A, 2B, 2C, 2D:
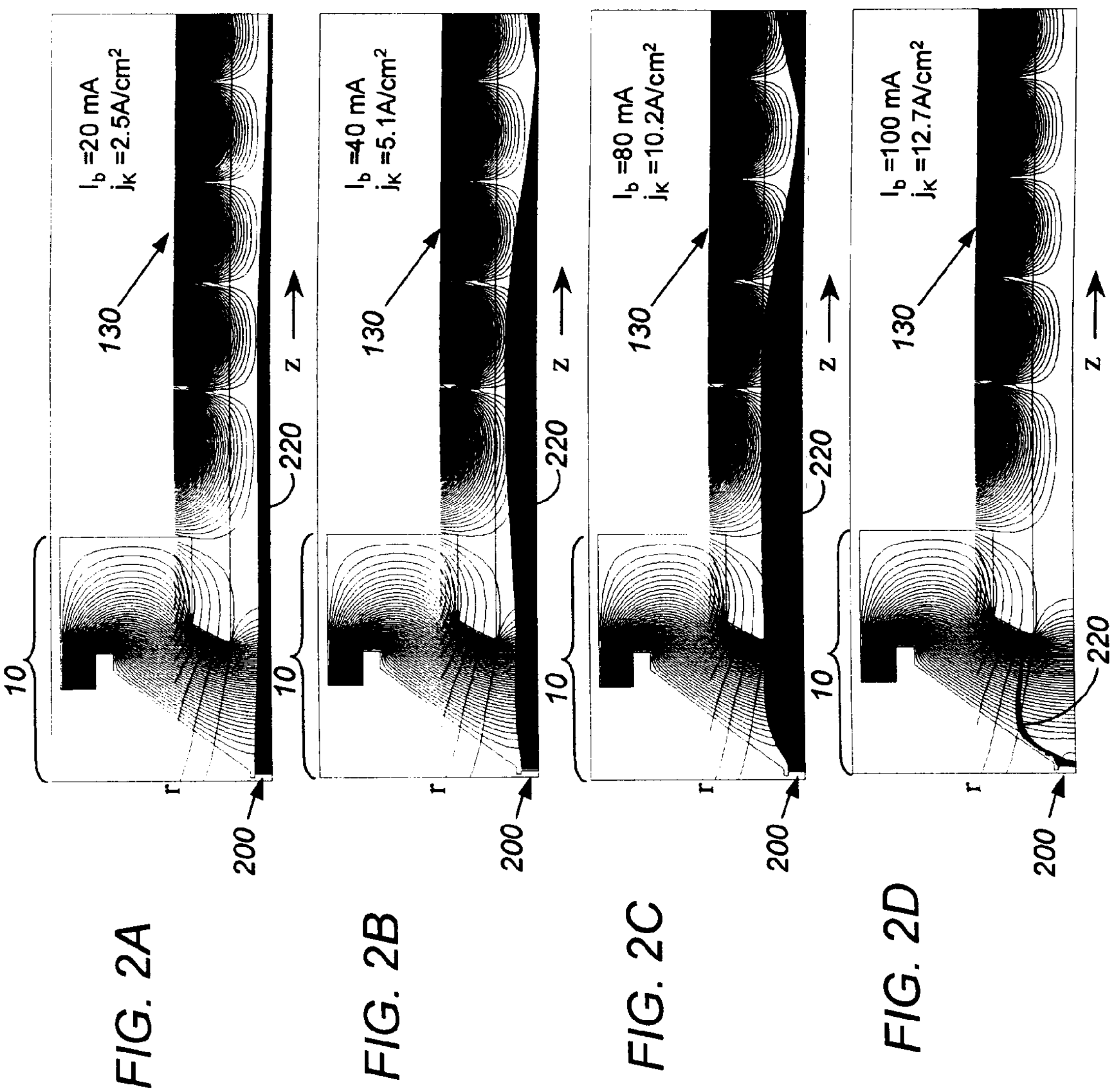
FIGS. 2*a* to 2*d* show the optics simulation of electron beam with different current densities propagating from a field emitter array into a magnetic field.

FIGS. 2$a$ to 2$d$ show the optics simulation of electron beam generated from a cold cathode electron emitter 200 with different current densities. In FIGS. 2$a$ to 2$d$, the convergent thermionic cathode is replaced with a smaller, higher current density, planar emitter, of which the emission surface is non-convergent. In FIG. 2$a$, an electron beam with a current of 20 mA (the current density $j_k$=2.5 A/cm$^2$) focused with standard Pierce geometry and traveling through a TWT PPM magnetic field is shown. As shown in FIG. 2$a$, the electron beam 120 is well focused to propagate along the PPM structure. In FIG. 2$b$, the current of the electron beam is increased to 40 mA ($j_k$=5.1 A/cm$^2$). As it can be seen in the figure, the space charge forces start to result in beam expansion and beam scalloping. As the beam current increased, the effect is more significant. In FIG. 2$c$, the current is increased to 80 mA, while the current density $j_k$ is 10.2 A/cm$^2$. Large scallops are developed, and beam interception on the beam tunnel is observed. When the current reaches 100 mA, and the current density $j_k$ is 12.7 A/cm$^2$, a virtual cathode is created as the electric field generated by the cathode-anode geometry is insufficient to overcome the large potential created by the high current density electron beam. In FIG. 2$d$, there is no electron beam observed in the beam tunnel. That is, no electron beam is transmitted and collected in the collector.

Figures 3A, 3B, 3C:
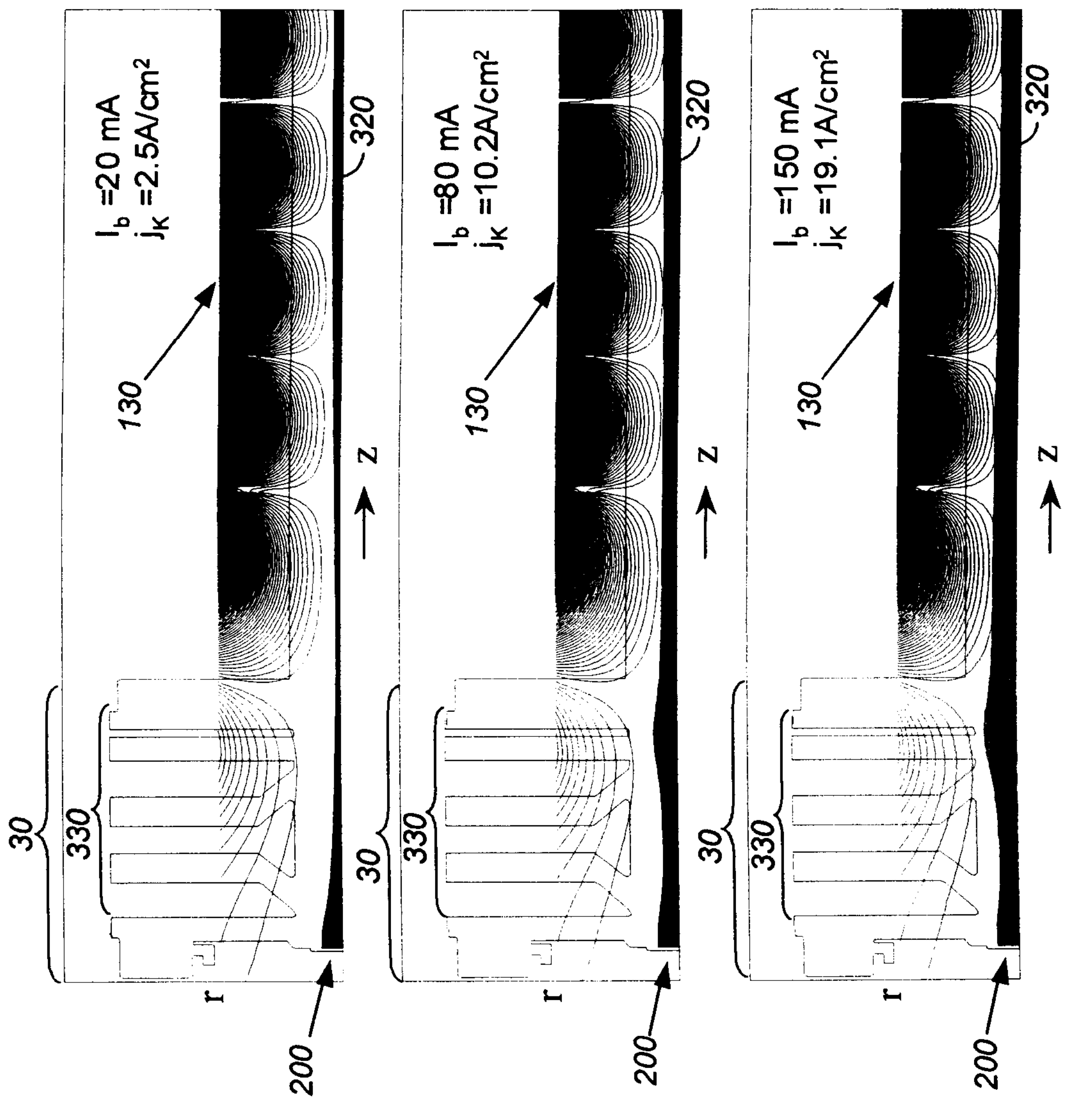
FIGS. 3*a* to 3*c* show the optics simulation of electron beam with different current densities propagating from a cold cathode electron emitter into a magnetic field of the invention.

FIGS. 3$a$ to 3$c$ present a new geometry to resolve the problems in focusing non-convergent, high current density, and high emittance cold cathode electron beams. In this invention, a series of shaped electrostatic lenses 220 are employed to allow the control of the electric field at the cathode surface and also allows for tailoring of the electric field profile during beam acceleration. In FIGS. 3$a$ to 3$c$, four lenses are used. It is appreciated that number of the lenses other than four can be selected according to specific design requirements. Similarly to FIGS. 2$a$ to 2$d$, an electron beam is emitted from a cold cathode electron emitter 200 (the electron gun). To achieve the focusing effect, the lenses are simultaneously applied with different focusing voltages, which are functions of the acceleration voltage and total beam current. The magnitudes of the focusing voltages are limited to a range to effectively focus the electron beam and confine it within the magnetic field subsequently. Again, five magnet cells, of which the magnetic contours are denoted as 130, are shown in FIGS. 3$a$ to 3$c$. In FIG. 3$a$, the electron beam with a low current 20 mA is well focused and confined. As the current increases up to 80 mA (with a current density of 10.2 A/cm$^2$), the electron beam is still under a good control is laminar and scallop-free. When the current reaches to 150 mA where Pierce geometry results in total beam reflection, as shown in FIG. 2$d$, the electron beam is still laminar and scallop-free. In this example, the geometry allows focusing of all currents for $0<I_{beam}<0.15$A, that is, the current densities falling within the range of $0<j_k\leq 20$ A/cm$^2$ and creates a scallop-free beam for injection into the RF circuit of the device.

Figure 4A:
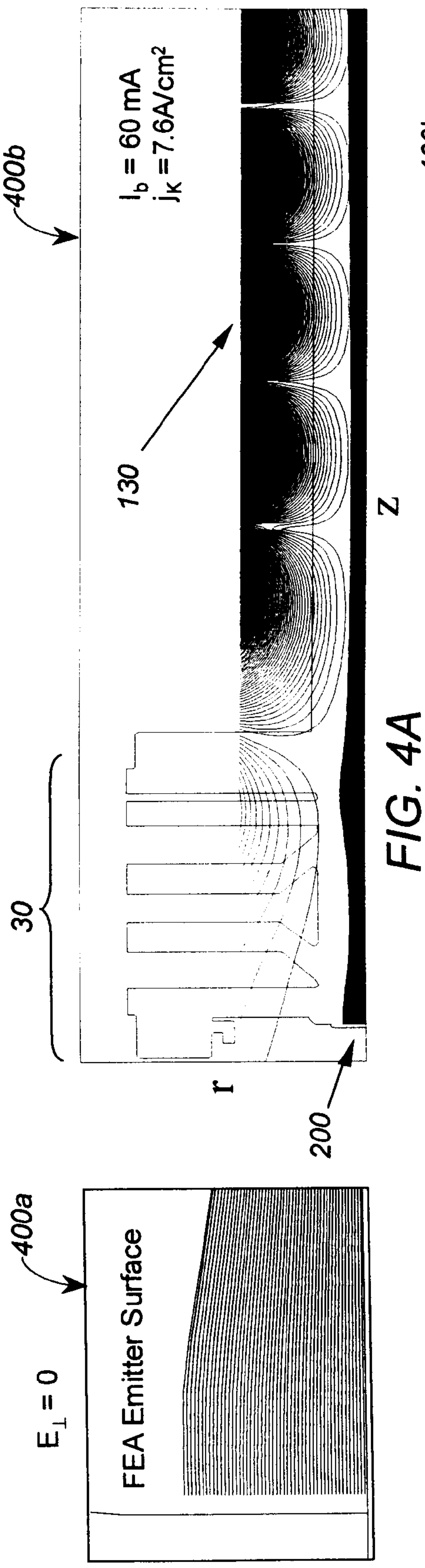
FIGS. 4*a* and 4*b* show the optics simulation of electron beam with $E_{\perp FWHM}$=0 and $F_{\perp FWHM}$=6 eV respectively, propagating from a cold cathode electron emitter into a magnetic field of the invention.
Figure 4B:
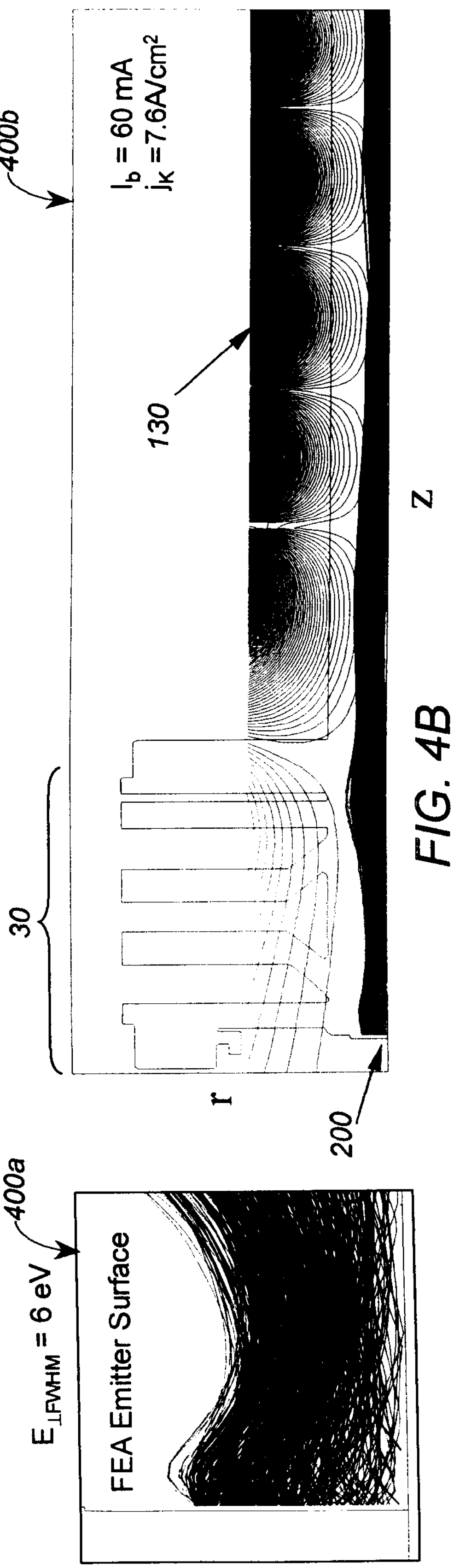

In addition to the current density of the electron beam, the emittance of the electron beam generated by the cold cathode electron emitter is also considered in the invention. FIG. 4$a$ shows the simulation of high emittance electron beams with perpendicular velocity distribution of $E_{\perp FWHM}$=6 eV, which is several times of that for the electron beams generated from a thermionic cathode. FIG. 4$b$ shows the simulation of electron beam with $E_{\perp FWHM}$=0 eV. In the left hand side of FIGS. 4$a$ and 4$b$, the expanded cathode view clearly shows the increased perpendicular velocity. Comparing FIGS. 4$a$ and 4$b$, although the beam profile in the beam tunnel is larger than that in the cold beam case, the electron beam is still well confined and propagates without interception on the gun lenses or beam tunnel. Therefore, the geometry proposed in the invention successfully accommodates the higher emittance cold cathode electron beam.

Figure 5:
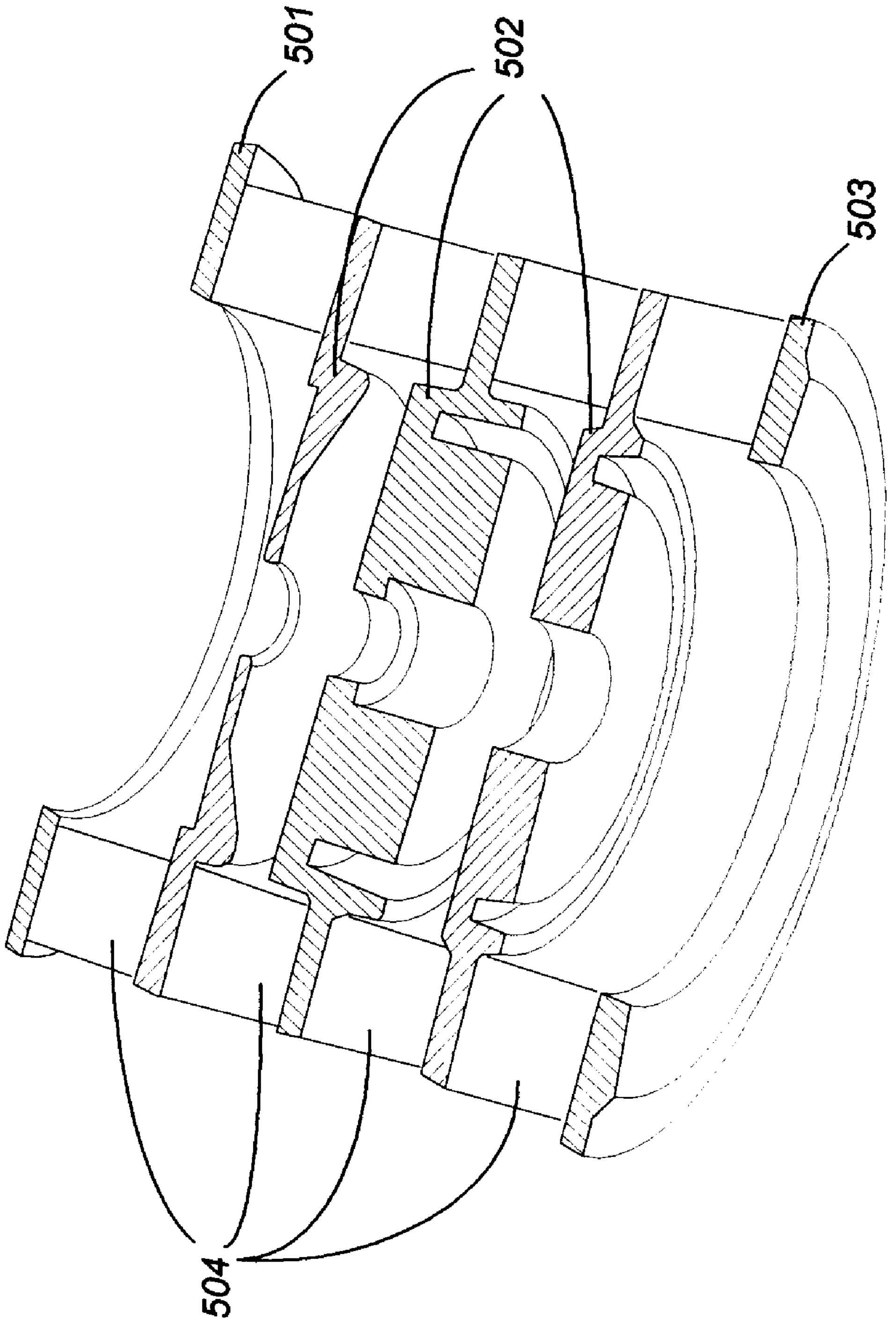
FIG. 5 shows the cross section of cold cathode electron emitter provided by the invention.

FIG. 5 shows cross section of an electron gun fabricated for a specific field emission array cold cathode emitter with 1 mm diameter emitting area. The series of shaped lenses 502 are clearly shown. The example comprises four lenses 502 and the grounded beam tunnel. The lenses are located in front of the emission surface (the emitter location 501) and spaced with isolation ceramics 504 from each other. In front of the electrostatic lenses 502, a weld flange for anode 503 is disposed to hold the non-intercepting anode. Between the weld flange for anode 503 and the neighboring electrostatic lens 502, an isolation ceramic 504 is also applied for isolation between the electrostatic lens 502 and the anode. Again, it is appreciated that number of the electrostatic lenses other than four may also be used according to specific design requirement. Further, while focusing the electron beam, the electrostatic lenses are simultaneously applied with different focusing voltages. The exact magnitude of the focusing voltages applied to the electrostatic lenses can be simulated and calculated from computer program.

Figure 6:
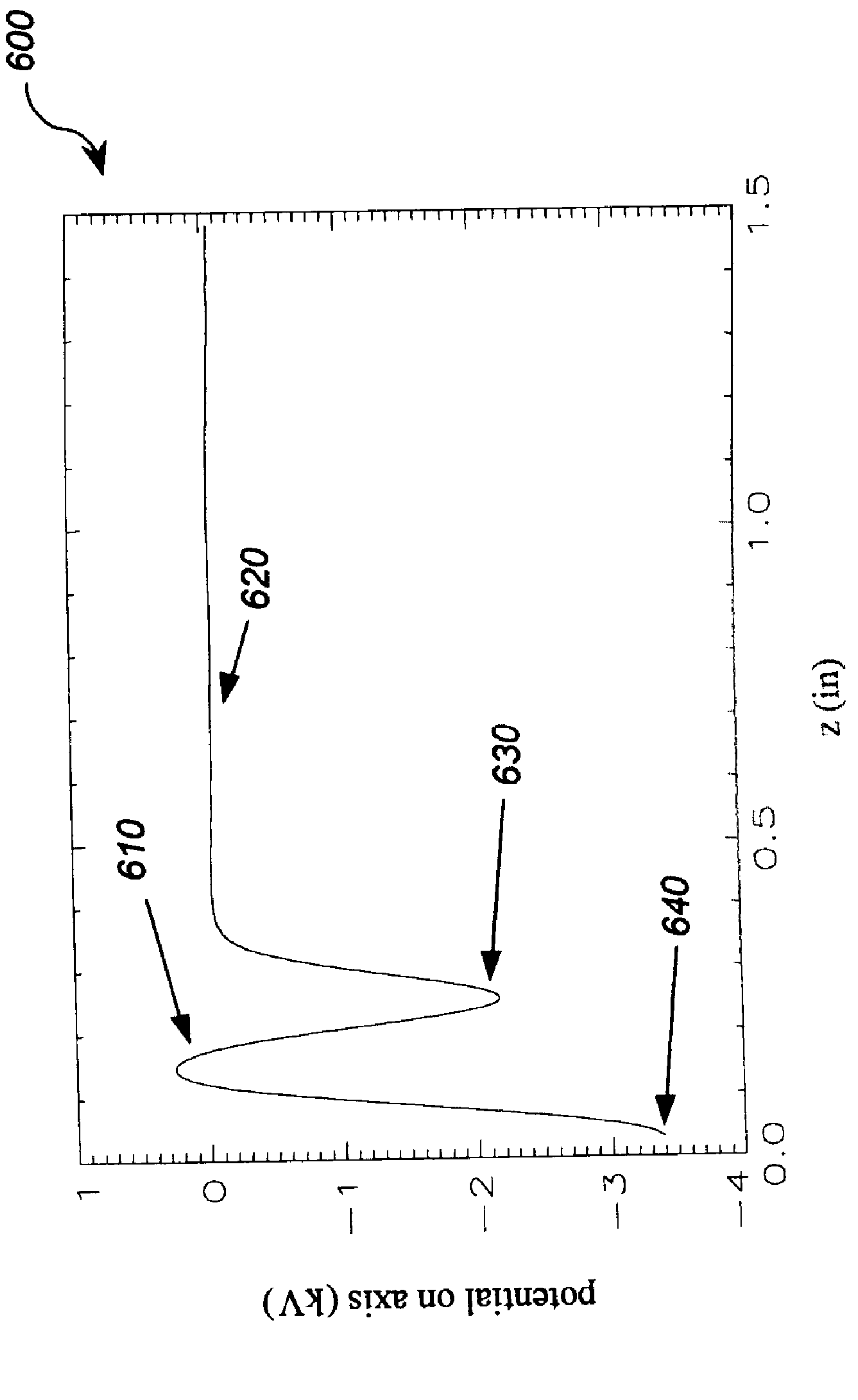
FIG. 6 shows the potential field profile along the axis of the cold cathode electron emitter of the invention.

FIG. 6 shows a graph of potential along the axis (z) of the electron gun applied with an acceleration voltage of 3400 V and a beam current of 50 mA. As shown in FIG. 6, the electron beam emitted from the emission surface starts with a negative potential. In front of the emission surface, an ion shield is disposed, such that the electrostatic potential where the ion shield is located is positive and typically has a value of several hundred volts. The ion shield function is further introduced in detail in the following paragraph. Through the focusing lenses, that is, the series of electrostatic lenses, the potential drops to a negative value. The potential reaches to ground in the beam tunnel.

When an ion is created somewhere in the emission system due to ionization of the background gas by high density electron beam, a positive charge is generated. In response to the negative potential of the electron gun, the ion is accelerated to the emission surface with high energy. If the emission surface of the emitter is fragile, the ion can easily damage the emitter by bombarding thereon and therefore degrade the emission characteristics of the emitter. Typically, the emission surface of the emitter is at a large negative potential. By inserting a positive potential between the negative emission surface and the ground body of the emitter, the large negative emitter potential is "shielded" from the rest of the device, thereby, precluding acceleration of destructive ions to the emission surface. The potential profile is shown in FIG. 6, in which the ion shield is placed immediately in front of the emission surface of the emitter where the potential is −3400V. Generally speaking, the positive potential applied to the ion shield has to be sufficiently high to effect the ion shield, that is, to prevent the ion bombardment. Thus designed, any ion created downstream of the ion shield will not be affected by the large negative cathode potential.

The reason why the prior art, that is, the standard Pierce electron gun, cannot incorporate an ion shield into the design is a result of the method of focusing employed. Pierce gun uses two focusing elements in a very specific geometry to create the potential profile required to focus the electron beam. One of these two elements (the focus electrode) is biased at the emitter potential and the other (the anode) at ground potential. If an attempt is made to bias one of these two elements to a positive potential, the focusing property of the Pierce electron gun is lost.

Figure 7:
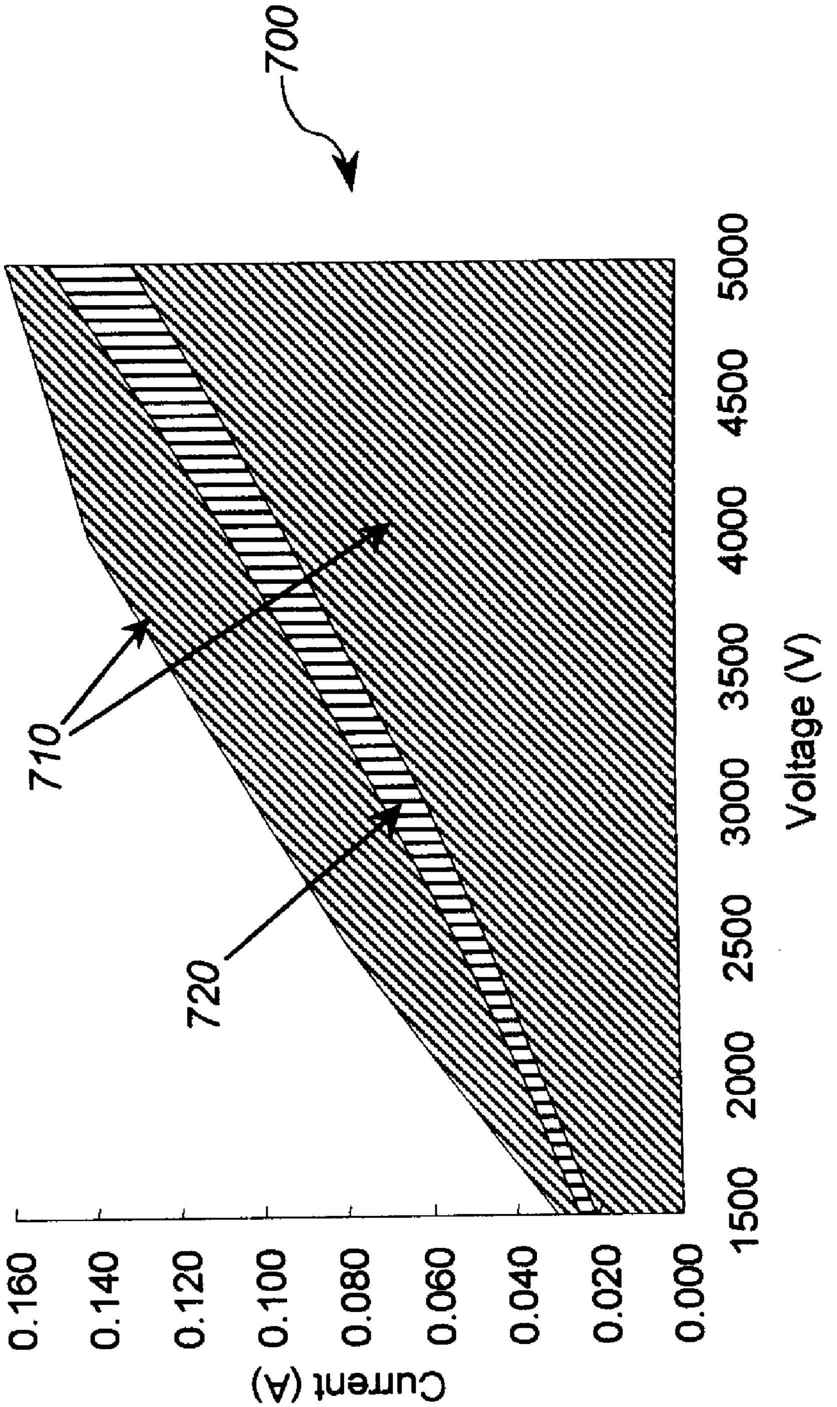
FIG. 7 shows the I-V operating region of electron beam generated by a conventional Pierce thermionic gun and the cold cathode electron emitter of the invention.

FIG. 7 illustrates the I-V parameter region of for laminar, scallop-free beam generation using a conventional Pierce electron gun and the cold cathode electron gun provided by the present invention. As shown in FIG. 7, the narrow region

720 that provides a high-qualify focused beam by the conventional thermionic emitter is enclosed in the very broad region 710 that provides the high-quality focused beam by the cold cathode electron gun provided by the invention. This broad coverage indicates the invention is able to provide high-quality focus for any combination of beam acceleration voltage and beam current and greatly exceeds the capability of Pierce geometry.

Figure 8:
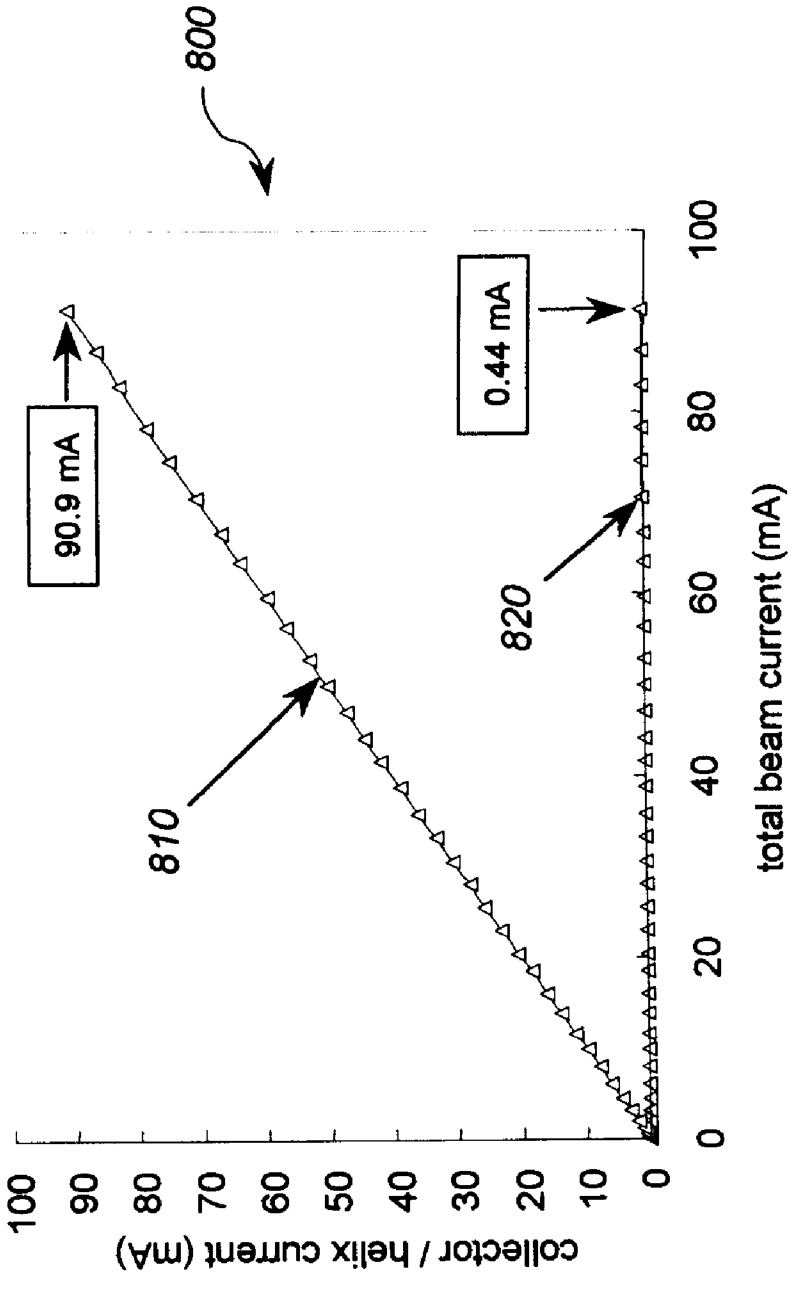
FIG. 8 shows the relationship between the collector/helix current and the total beam current.

FIG. 8 shows a relationship between the collector/helix current versus the total beam current beam. This graph further verifies that the cold cathode electron gun effectively focuses the electron beam by incorporating the electron gun into an FEA-TWT structure. In FIG. 8, the helix and collector current of the device are functions of total beam current. In the FEA-TWT structure, the collector is located about 10 cm from the electron gun. The helix is located along the entire path between the electron gun and the collector. If the required focusing were not realized, that is, without the series of electrostatic lenses used in the above embodiment, the helix current would increase dramatically as total beam current increases. Instead of having the helix current increase dramatically with the beam current, the invention obtains a constant near-zero helix current.

Indeed, each of the features and embodiments described herein can be used by itself, or in combination with one or more of other features and embodiment. Thus, the invention is not limited by the illustrated embodiment but is to be defined by the following claims when read in the broadest reasonable manner to preserve the validity of the claims.

What is claimed is:

1. An apparatus of focusing a high-current-density electron beam emitted from a cold cathode electron emitter, comprising a series of shaped electrostatic lenses and an ion shield, all located in front of an emission surface of the cold cathode electron emitter, wherein the ion shield includes applying a positive potential between the emission surface and a grounded body of the cold cathode electron emitter, wherein the positive potential is sufficiently high to prevent ion bombardment.

2. The apparatus according to claim 1, wherein the cold cathode electron emitter comprises a non-convergent emission surface, from which the high-current-density electron beam is emitted.

3. The apparatus according to claim 1, wherein the series of shaped electrostatic lenses comprises four electrostatic lenses.

4. The apparatus according to claim 1, further comprising an isolation ceramic between every neighboring two of the electrostatic lenses for isolation.

5. The apparatus according to claim 1, wherein the cold cathode electron emitter further comprises a weld flange holding an anode in front of the series of electrostatic lenses.

6. The apparatus according to claim 5, further comprising an isolation ceramic between one of the electrostatic lenses that is closest to the anode and the anode for isolation.

7. The apparatus according to claim 1, wherein the current density range of the high-current-density electron beam is between about 0 A/cm$^2$ to about 20 A/cm$^2$.

8. A method for focusing a high-current-density electron beam emitted from a cold cathode electron emitter, comprising the steps of:

providing a series of electrostatic lenses in front of and apart from an emission surface of the cold cathode electron emitter; and applying various voltages to each of the electrostatic lenses simultaneously, wherein the voltages are simulated and calculated with certain values to result a well-focused and confined laminar electron beam which enters a magnetic field.

9. The method according to claim 8, further comprising a step of providing an ion shield in front of an emission surface of the cold cathode electron emitter.

10. The method according to claim 8, further comprising a step of providing the electron beam with a current density between 0 A/cm$^2$ to 20 A/cm$^2$.

11. A cold cathode electron emission system, comprising:

an electron gun, with a planar emission surface, from where a high-current-density electron beam is emitted;

an ion shield, in front of the planar emission surface; and a series of electrostatic lenses, in front of the ion shield, from which the high-current-density electron beam is focused and then enters a magnetic field.

12. The system according to claim 11, wherein a current density range of the high-current-density electron beam is between about 0 A/cm$^2$ to about 20 A/cm$^2$.

13. The system according to claim 11, wherein the ion shield applies a positive potential sufficiently high to prevention bombardment.

14. The system according to claim 11, wherein the series of electrostatic lenses comprises four electrostatic lenses.

15. The system according to claim 11, further comprising an isolation ceramic between every neighboring two of the electrostatic lenses for isolation.

16. An apparatus for focusing a single electron beam emitted from a cold cathode electron emitter, comprising:

a series of electrostatic lenses located in front of and apart from the electron emitter, the electrostatic lenses being operative to focus the single electron beam which enters a magnetic field; and an ion shield between the electron emitter and the electrostatic lenses for applying a positive potential sufficiently high to prevent ion bombardment.

17. The apparatus according to claim 16 wherein the cold cathode electron emitter comprises a non-convergent emission surface from which the single electron beam is emitted.

18. The apparatus according to claim 16 wherein the cold cathode electron emitter comprises a weld flange holding an anode in front of the electrostatic lenses.

19. The apparatus according to claim 16 wherein the electron beam is a high-current-density electron beam having a current density range of between about 0 A/cm$^2$ to about 20 A/cm$^2$.

20. A method for focusing a single electron beam emitted from a cold cathode electron emitter, comprising the steps of:

a) locating a series of electrostatic lenses in front of and apart from the cold cathode electron emitter;

b) locating an ion shield between the cold cathode electron emitter and the electrostatic lenses;

c) emitting the single electron beam from the electron emitter towards the electrostatic lenses;

d) focusing the single electron beam with the electrostatic lenses and applying a positive potential sufficiently high to prevent ion bombardment with the ion shield; and e) entering a magnetic field with the single focused electron beam.

21. The method according to claim 20 wherein step a) further comprises placing an isolation ceramic between every neighboring two of the electrostatic lenses for isolation.

22. The method according to claim 20 wherein step b) comprises emitting the single electron beam having a current density range of between about 0 A/cm to about 20 A/cm$^2$.

* * * * *